(12) United States Patent
Euteneuer et al.

(10) Patent No.: US 10,025,081 B2
(45) Date of Patent: Jul. 17, 2018

(54) MICROSCOPE FOR EVANESCENT ILLUMINATION AND POINT-SHAPED RASTER ILLUMINATION

(71) Applicant: Leica Microsystems CMS GmbH, Wetzlar (DE)

(72) Inventors: Peter Euteneuer, Lahnau (DE); Christian Schumann, Giessen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 176 days.

(21) Appl. No.: 15/035,067

(22) PCT Filed: Oct. 30, 2014

(86) PCT No.: PCT/EP2014/073347
§ 371 (c)(1),
(2) Date: May 6, 2016

(87) PCT Pub. No.: WO2015/067521
PCT Pub. Date: May 14, 2015

(65) Prior Publication Data
US 2016/0266364 A1    Sep. 15, 2016

(30) Foreign Application Priority Data

Nov. 6, 2013 (DE) .......... 10 2013 222 562

(51) Int. Cl.
*G02B 21/06* (2006.01)
*G02B 21/00* (2006.01)

(52) U.S. Cl.
CPC ....... *G02B 21/0032* (2013.01); *G02B 21/006* (2013.01); *G02B 21/0064* (2013.01); *G02B 21/0068* (2013.01); *G02B 21/002* (2013.01)

(58) Field of Classification Search
CPC .. G02B 21/00; G02B 21/0004; G02B 21/002; G02B 21/0024; G02B 21/0028;
(Continued)

(56) References Cited

U.S. PATENT DOCUMENTS 7,187,494 B2     3/2007   Nishiwaki et al.
2004/0174523 A1*  9/2004   Uhl .................... G01N 21/552
                                                  356/318

(Continued)

FOREIGN PATENT DOCUMENTS

DE        10344410 A1     4/2005
DE      102004034961 A1   2/2006

(Continued)

OTHER PUBLICATIONS

International Search Report from PCT/EP2014/073347, filed Oct. 30, 2014, dated Feb. 3, 2015.

*Primary Examiner* — Arnel C Lavarias
(74) *Attorney, Agent, or Firm* — Patentbar International, P.C.

(57) ABSTRACT

An objective and an illumination unit for selectable generation of an orthoscopic beam path proceeding through the objective for pointlike scanning illumination, and of a conoscopic beam path proceeding through the objective for evanescent illumination of an object are disclosed. The illumination unit has a light source for generating illuminating rays along an illuminating beam path; a displacement unit for deflecting the illuminating beam path; a scanning eyepiece, placed after the displacement unit for focusing the illuminating rays into an image plane of the scanning eyepiece; and a mirror surface arranged in the image plane of the scanning eyepiece, having a transparent region for generating the orthoscopic beam path and having an at least partly reflective region facing toward the scanning eyepiece for generating the conoscopic beam path from the illumi- (Continued)

nating beam path, the image plane is located in a plane conjugated with the exit pupil.

21 Claims, 3 Drawing Sheets

(58) Field of Classification Search
CPC ............ G02B 21/0032; G02B 21/0036; G02B 21/0052; G02B 21/006; G02B 21/0064; G02B 21/0068; G02B 21/0076; G02B 21/06; G02B 21/18; G02B 21/36; G02B 21/361; G02B 21/362
USPC ....... 359/362, 363, 368, 369, 372, 385, 386, 359/387, 388, 389

See application file for complete search history.

(56) References Cited

U.S. PATENT DOCUMENTS

| 2006/0250690 | A1* | 11/2006 | Ulrich .................... G02B 21/06 359/385 |
| 2007/0052958 | A1 | 3/2007 | Ulrich et al. |
| 2007/0097496 | A1* | 5/2007 | Ulrich .................... G02B 21/02 359/385 |
| 2009/0128827 | A1 | 5/2009 | de Groot et al. |
| 2011/0069382 | A1 | 3/2011 | Toomre et al. |
| 2013/0314775 | A1* | 11/2013 | Takamizawa ........ G01N 21/648 359/363 |

FOREIGN PATENT DOCUMENTS

| WO | 2002/086578 | A2 | 10/2002 |
| WO | 2005/031428 | A1 | 4/2005 |
| WO | 2007/020251 | A1 | 2/2007 |
| WO | 2013/084678 | A1 | 6/2013 |

* cited by examiner

MICROSCOPE FOR EVANESCENT ILLUMINATION AND POINT-SHAPED RASTER ILLUMINATION

RELATED APPLICATIONS

This application is a U.S. National Stage Under 35 USC § 371 of International Application PCT/EP2014/073347, filed on Oct. 30, 2014, which in turn claims priority to German Patent Applications DE 10 2013 222 562.8, filed Nov. 6, 2013, all of which are incorporated herein by reference in their entirety.

FIELD OF THE INVENTION

The present invention relates to a microscope for evanescent illumination and point-like scanning illumination, a changeover between these two illumination modes being possible. The invention furthermore relates to a method for changing over between the aforesaid illumination modes.

BACKGROUND OF THE INVENTION

Microscopes that allow a changeover between evanescent illumination and point-like scanning illumination of an object are known from the existing art.

WO 2005/031428 A1 discloses a microscope with evanescent sample illumination, which additionally comprises an optical apparatus for manipulating a sample. Here a laser serves to generate an illuminating light ray bundle that is focused into the back pupil plane of the microscope objective. A beam deflection device that encompasses a gimbal-mounted rotating mirror serves to adjust the lateral distance of the focus of this laser light ray bundle with respect to the optical axis of the objective. When the distance of the focus with respect to the optical axis of the objective is sufficient, total reflection occurs at the boundary surface between the sample holder (for example, a cover slip) and the sample. The evanescent field produced as a result penetrates only into the boundary surface of the sample and decreases exponentially with distance from that boundary surface. Fluorophores present in the boundary surface of the sample are thus excited, while background fluorescence can be considerably reduced. Image contrast is thereby improved. This method is referred to generally as total internal reflection fluorescence microscopy (TIRFM).

The apparatus for manipulating a sample encompasses, for example, a multi-line laser from whose emission spectrum the components having the desired wavelengths are selectable using an acousto-optical tunable filter (AOTF). The position of the manipulating light ray bundle that is focused into the sample is adjusted with a further beam deflection device.

In an embodiment, in order to change over between manipulation illumination and TIRF illumination, a hinged mirror is pivoted into the TIRF illuminating beam path so that the TIRF illuminating beam path strikes the non-reflective back side of the hinged mirror and is prevented from propagating further. In its pivoted-in position the hinged mirror is arranged in such a way that the manipulating light ray bundle is reflected at the hinged mirror and thereby coupled into the illuminating beam path. In another embodiment a single laser light source having selectable wavelengths is used both for TIRF illumination and for manipulation illumination. In this case a switchover between the two illumination modes is effected by simply introducing an adaptation optic into the illuminating beam path. The effect of this adaptation optic is that for TIRF illumination, the laser ray bundle is focused into the back pupil plane of the microscope objective. Without the adaptation optic, conversely, the laser ray bundle is focused into the sample. The manipulation light ray bundle is, as a rule, a laser scanning beam for (confocal) scanning microscopy.

In this document, optical components (hinged mirror or adaptation optic) are consequently introduced into or removed from the illuminating beam path in order to switch over between TIRF illumination and manipulation illumination.

A confocal scanning microscope generally encompasses a light source, a focusing optic with which the light of the source is focused onto an aperture (called the "excitation pinhole"), a beam splitter, a beam deflection device for beam control, a microscope optic, a detection pinhole, and detectors for detecting the detected or fluorescent light emitted from the sample. The illuminating light is coupled in via a beam splitter. The fluorescent or detected light emitted from the object travels via the beam deflection device back to the beam splitter, passes through it, and is then focused onto the detection pinhole behind which the detectors are located. This detection arrangement is called a "descan" arrangement. Detected light that does not derive directly from the focus region does not pass through the detection pinhole, so what is obtained is a point datum that, by sequential scanning of the object with the focus of the illuminating light ray bundle, can be assembled into a three-dimensional image. A three-dimensional image is usually achieved by acquiring image data in layers in different focal planes.

The subject matter of U.S. Pat. No. 7,187,494 B2 is a microscope having a laser light source, the microscope comprising a deflection unit for decentering the laser beam out of the optical axis, and an objective through which the laser beam passes. In an exemplifying embodiment a so-called collector lens arrangement, which is arranged introducibly into and removably from the illuminating beam path, is proposed for switching over between scanning microscopy and TIRF microscopy. When the collector lens arrangement is in the illuminating beam path, the laser light beam is focused decenteredly into the pupil of the objective (TIRF illumination), while when the collector lens arrangement is removed from the illuminating beam path the laser beam is focused onto the sample and scans it.

With this microscope it has proven to be disadvantageous that the switchover between TIRF microscopy and scanning microscopy is too slow for many applications, and that the alignment outlay for the elements introducible into the illuminating beam path is very high if the intention is to achieve precise beam guidance in both microscopy modes.

WO 2007/020251 A1 discloses a microscope for TIRF microscopy in which laser light of a laser light source is directed firstly via a hole in a mirror and then via a displacement unit toward a microscope objective. For the laser beam, the hole on the non-reflective side of the mirror presents itself as an ordinary aperture opening whose diameter corresponds to the diameter of the illuminating light ray at the location of the mirror. The reflective surface is located on the other side of the mirror. By way of the displacement unit, the laser beam acquires its decentering required for TIRF illumination. As a result, it can be incident at a critical angle onto the boundary surface between the sample carrier and object. For the transition from a cover slip having a refractive index $n_1=1.518$ to water having a refractive index $n_2=1.33$, for example, this critical angle has a value of 61° (the total reflection angle).

In an embodiment the laser beam is guided rotationally symmetrically with respect to the main axis of the object, by means of the displacement unit, in such a way that an evanescent field is generated in the object as a result of total reflection. The total reflection angle required for this can only be calculated if the refractive index of the sample is known. Often, however, different samples are involved, usually having unknown refractive indices. In order nevertheless to allow an empirical indication of the total reflection angle, i.e. to allow evanescent illumination to be established automatically, this document proposes detecting the reflected light that occurs before the critical total reflection angle is reached. This light travels through the microscope objective back to the displacement unit and from there onto the reflective surface of the mirror arranged in the illuminating beam path. From there the reflected light is reflected into a detector. The proportion of reflected light decreases drastically when the total reflection angle is reached, since the laser beam is now totally reflected in the sample carrier at the interface with the object, and excites the evanescent field. The position of total reflection, i.e. the degree of deflection by the displacement unit necessary therefor, can be determined from this transition.

In modern microscopes, especially inverted ones, investigation of living systems such as cells requires a variety of illumination methods for a single sample. For this, as a general rule, lasers having different wavelengths are switched in temporal succession at very short time intervals in order to excite or manipulate the sample and for subsequent measurement and evaluation. With the systems described above for TIRF microscopy and laser scanning microscopy, mirror elements and/or lens elements must be mechanically introduced into or removed from the illuminating beam path. When individual illumination modules are coupled together with the aid of such movable optical elements, each module has its specific laser light illumination system, and these must often be laboriously synchronized with one another for the experiment. Mechanical introduction and removal of the optical elements has a negative effect on the desired short time intervals between excitation/manipulation and measurement/evaluation. In addition, mechanical switching and shifting arrangements of this kind having the accuracy necessary for the application are mechanically complex and correspondingly expensive.

In addition to the illumination methods recited above, mention will also be made hereinafter of fluorescence recovery after photobleaching (FRAP) and Förster resonance energy transfer (FRET). In FRAP, a dye in the sample is destroyed (bleached) with X-Y precision at high intensities, and adjacent compartments are then excited via suitable illumination (for example TIRF illumination). If the bleached and excited compartments are connected, dye can travel by diffusion into the bleached regions. High switching rates are needed in order to detect this.

The FRET method uses fluorophores in which the donor is excited and the acceptor emits light as a result of resonance energy transfer. Precise spot laser scanning illumination at a suitable frequency allows the acceptors to be selectively destroyed (bleached), while the donors survive.

The intensity of the resonance energy transfer depends, inter alia, on the distance between donor and acceptor. If the distance is too great or if the acceptors are bleached, the donor itself then radiates the energy as a fluorescence emission. The distance necessary for resonance energy transfer is in the range from approximately 0.5 to 10 nm. A measurement of the radiation intensity of the donor dye in the absence and the presence of the acceptor dye allows inferences as to biochemical processes in the sample. For example, donor and acceptor dyes can be coupled to substances whose physical interaction is to be investigated. If an energy transfer that is measurable on the basis of the aforementioned radiation intensity takes place, the two substances are physically interacting. A lower switchover rate is required for the FRET method as compared with the FRAP method, but there are greater demands in terms of resolution for investigating biochemical processes in the cells being examined.

Multiphoton microscopy represents a further scanning imaging method. Here, nonlinear optical effects are generated with the aid of a focused high-energy laser beam. The construction and manner of operation of a multiphoton microscope are similar to those of a confocal laser scanning microscope. Whereas the latter achieves penetration depths from 50 to 80 µm (depending on the specimen), penetration depths of several hundred µm can be attained with multiphoton microscopy. This allows image production to extend into deeper tissue regions. In multiphoton fluorescence microscopy, two or more simultaneously incident photons are absorbed by an electron of a dye, and the transition into the ground state occurs with emission of a short-wave photon. The excitation photons, on the other hand, have a longer wavelength. With two-photon excitation the excitation wavelength is approximately twice the excitation wavelength normally used in fluorescence microscopy.

High photon densities are necessary in order to achieve simultaneous absorption of two or more photons, and can be furnished using high-intensity pulsed lasers. As in the case of a confocal laser scanning microscope, the laser beam is focused through the microscope's objective onto a point in the specimen. The focused laser beam is scanned over the specimen by means of a scanning unit. The emitted fluorescent radiation is directed to a detector via the objective and a dichroic beam splitter. The off-times between two laser pulses are sufficiently long that the energy introduced into the specimen can be re-emitted as fluorescent radiation in a fraction of that time. The detectors therefore measure the brightness of each image point, so that a complete image of the specimen can be assembled once the specimen has been scanned.

An advantage of multiphoton microscopy as compared with confocal laser scanning microscopy is the greater penetration depth. In two-photon microscopy, for example, the light used for excitation is infrared, which is scattered and absorbed much less than visible light in biological tissue. In contrast to confocal laser scanning microscopy, with multiphoton microscopy all of the fluorescence collected by the objective is used for the image that is to be created; a pinhole is therefore not needed in order to filter out light from other planes. This is because the light intensities outside the focal plane are not sufficient to cause multiphoton excitation of the fluorescent dye therein. It is therefore also not necessary to capture the fluorescent radiation via the scanning mirror ("non-descanned" detection). With a short-pulse laser and an integral detector, a system of this kind can be combined as a TIRF and multiphoton system.

The object of the present invention is to describe a microscope that makes possible, without mechanical introduction and removal of optical elements respectively into and from the illuminating beam path, a fast changeover between pointlike scanning illumination (or "image scanning") and evanescent illumination (or "pupil scanning"). Hereinafter the illuminating beam path for pointlike scanning illumination will be called an "orthoscopic beam path," and the illuminating beam path for evanescent illumination will be called a "conoscopic beam path."

SUMMARY OF THE INVENTION

The microscope according to the present invention comprises an objective and an illumination unit for selectable generation of an orthoscopic beam path proceeding through the objective for pointlike scanning illumination, and of a conoscopic beam path proceeding through the objective for evanescent illumination of an object. The illumination unit of the microscope encompasses a light source for generating illuminating rays along an illuminating beam path; a displacement unit for deflecting the illuminating beam path; and a scanning eyepiece, placed after the displacement unit, for focusing the illuminating rays into an image plane of the scanning eyepiece. The displacement unit (scanner) directs the illuminating rays out of the optical axis, the deflected illuminating rays being focused by the scanning eyepiece into the image plane thereof.

Located after the displacement unit is a stationary mirror surface having an (at least partly) transparent and an (at least partly) reflective region. The transparent region serves to generate the orthoscopic beam path after the illuminating rays pass through this transparent region of the mirror surface, while the reflective region serves to generate the conoscopic beam path from the illuminating beam path after deflection thereof at the reflective surface. The image plane of the scanning eyepiece is located, with reference to the conoscopic beam path, in a plane conjugated with the exit pupil of the objective.

According to the present invention, with the microscope configuration as indicated, the orthoscopic beam path can be generated by the fact that the illuminating beam path is deflected by means of the displacement unit in such a way that it passes through the transparent region of the mirror surface, while the conoscopic beam path is generated by the fact that the illuminating beam path is deflected by means of the displacement unit in such a way that it strikes the reflective region of the mirror surface.

Advantages of the Invention

The present invention allows a fast changeover between the two aforesaid illuminating modes (image scanning and pupil scanning), for which purpose the image location and pupil location in the mirror surface region are exchanged. The mirror surface is arranged, for example, in the image plane of the scanning eyepiece. For image scanning, the illuminating beam path is deflected by the displacement unit (scanner) in such a way that the focal points of the illuminating rays are located inside the transparent region of the stationary mirror surface. In the simple instance the transparent region is an opening in the mirror surface. Alternatively, the mirror surface can have in the transparent region, instead of a mirrored (i.e. highly reflective) coating such as the one applied in a reflective region onto the carrier glass, a highly reflection-decreasing coating, and usefully is for that purpose the same size as the maximum image scan field, whose boundaries are defined by the transition to evanescent illumination. The reason is that if the exit pupil of a microscope objective, here of a TIRF objective, is imaged by magnification out to the limit aperture of total reflection (approx. 1.37), into the image plane of the scanning eyepiece via the conoscopic beam path, in such a way that it is congruent with the maximum image scan field; and if the mirror surface is placed with its transparent region (the same size as the maximum image scan field) into the image plane of the scanning eyepiece at an angle other than 0°, usefully at 45°, the light rays for generating evanescent illumination are then reflected outside the transparent region, at the reflective region, into the conoscopic beam path.

It is thereby possible to change over between image scanning and pupil scanning by simply controlling the scanning angle with the scanner (displacement unit). The reason is that as long as the scanning angle is located in a region in which the illuminating rays are located within the transparent region of the mirror surface, image scanning (i.e. pointlike scanning illumination) can occur out to a maximum scan field. It is only when the scanning angle becomes greater that the illuminating rays of the light source are incident onto the reflective region of the mirror surface and are directed into the conoscopic beam path, and are imaged in such a way that the illuminating rays are focused onto the outer region of the objective pupil of the objective.

A transition from image scanning to pupil scanning, i.e. to evanescent illumination, is possible merely by modifying the scanning angle, without introducing optical components into the illuminating beam path or conveying them out of the illuminating beam path. All optical components of the microscope according to the present invention can be initially aligned in permanent fashion and need no further modification as the microscope is used. In addition, a single light source can be used for both beam paths, with the result that complex synchronization and alignment are superfluous; there is also a corresponding cost advantage. The microscope according to the present invention implements both beam paths in a single system that can be controlled, in particular, by a single computer having centralized software. A further advantage of the microscope according to the present invention is that normal image scanning out to the maximum scan field is also unrestrictedly possible using other objectives (i.e. not TIRF objectives).

The present invention is thus suitable not only for fast changeover between evanescent illumination and pointlike scanning illumination, but also as a universal module for photomanipulation. Reference may be made in this regard to the methods recited in the introduction to the description, such as FRAP or FRET. Also conceivable is a combination with a short-pulse laser (e.g. inexpensive fiber laser) and an integral detection system (having a so-called non-descanned detector), as an inexpensive multiphoton imaging system. Scanning of the sample in image scanning mode allows it to be imaged three-dimensionally in the manner of multiphoton microscopy. Here as well, as already explained, the opening in the mirror surface limits the size of the maximum scan field. Multiphoton microscopy has likewise already been explained in the introduction to the description. In summary, the present invention can be utilized in a variety of scanning imaging methods that can be subdivided into the following groups: confocal microscopy (with Z resolution), widefield microscopy with a manipulation laser, multiphoton microscopy, and non-confocal image acquisition (without Z resolution). The aforementioned widefield microscopy can be respectively combined with multiphoton microscopy or with non-confocal image acquisition (without Z resolution).

It is particularly advantageous if the transparent region of the mirror surface represents a simple opening in an otherwise reflective mirror surface, the opening being arranged centeredly with respect to the main axis of the illuminating beam path. The "main axis of the illuminating beam path" is to be understood in this Application as the axis of the undeflected illuminating beam path, i.e. the optical axis.

For effective outcoupling of the light rays reflected at the reflective region of the mirror surface, the mirror surface is arranged at a tilt with respect to the main axis of the illuminating beam path, the tilt angle being in particular 45°.

It is especially advantageous if the transparent region of the mirror surface has a geometric shape whose projection onto a plane perpendicular to the main axis of the illuminating beam path yields a circular shape. This is achieved by the geometry of an ellipse. The axes of the ellipse are dimensioned so that the aforementioned projection yields a circular shape.

Beyond certain scanning angles the illuminating light arrives onto the reflective region of the mirror surface and is reflected into the conoscopic beam path. In this case it is useful if an additional optic is provided for coupling the conoscopic beam path into the microscope objective. This additional optic is designed in particular in such a way that the focus of the illuminating rays of the conoscopic beam path is now located in the exit pupil of the objective, in particular at its edge. Advantageously, the additional optic encompasses a mirror system and an optical system, in particular in the form of a Bertrand lens. While the conoscopic beam path is guided via the mirror system toward the microscope objective, the image of the Bertrand lens is embodied so that the illuminating rays are focused at the edge of the exit pupil of the microscope objective.

It has proven to be particularly advantageous that the additional optic comprises a beam splitter that is arranged in the orthoscopic beam path and combines the conoscopic beam path with the orthoscopic beam path before the two beam paths travel through the microscope objective.

An appropriate additional optic consequently encompasses the following optical components: a first lens, followed by a deflection mirror that deflects the conoscopic beam path in a direction substantially parallel to the orthoscopic beam path. Following the deflection mirror is a further deflection mirror that deflects the conoscopic beam path substantially 90° in order to pass through a second lens. The conoscopic beam path then encounters a beam splitter that is arranged in the orthoscopic beam path, this beam splitter allowing the orthoscopic beam path to pass while reflecting the conoscopic beam path in such a way that the two beam paths are guided together to the microscope objective.

In a particular embodiment of the beam splitter, a polarizing beam splitter is used. In this case polarized laser light can be used for illumination, a λ/2 plate being introduced into one of the two beam paths in order to oppositely polarize the relevant beam path. With the configuration of the additional optic as just described, for example, the λ/2 plate can be arranged between the two deflection mirrors in the conoscopic beam path. The polarizing beam splitter is transparent or reflective depending on the polarization. The result is to achieve beam splitting with identical wavelength and, in the instance considered, combination of the two beam paths with identical wavelengths. If different wavelengths are to be used for the two illumination modes, a corresponding wavelength-sensitive beam splitter can be used as a beam splitter.

It is furthermore advantageous if one or more lasers for generating illuminating rays of a specific wavelength spectrum is or are present as a light source of the illumination unit of the microscope according to the present invention, a wavelength selector being arranged in the illuminating beam path for the selection of suitable wavelengths. Said selector is, in particular, an acousto-optical tunable filter (AOTF). An AOTF of this kind allows very fast switchover and thus selection of specific wavelengths. This is because if the two illuminating modes are implemented with different wavelengths, the fast changeover according to the present invention between these illuminating modes then occurs simultaneously with a changeover of the requisite wavelengths. At the same time, an AOTF can also be used as a fast shutter, i.e. for one specific illuminating mode can inject the necessary wavelengths into the illuminating beam path, and for another illuminating mode can inject no laser beams into the illuminating beam path. This is useful during method switchovers, for example when the laser light is shut off upon movement of the scanner toward the conoscopic beam path. In addition, precise manipulation of the sample also requires, in addition to accurate positioning of the displacement unit, suppression of the laser during movement into the manipulation region.

The displacement unit (scanner) for deflecting the illuminating beam path is embodied in particular in such a way that a circular deflection can be implemented. A TIRF illumination that is rotationally symmetrical with respect to the main axis of the objective can be implemented in this case. In addition, however, in a context of illumination inside the image scan field, it is also possible to implement oblique illumination ("epi-illumination") that can also occur, for example, along a circular trajectory, so that classic epi-illumination exists when averaged over time.

With regard to the method according to the present invention for selective generation of an orthoscopic beam path and of a conoscopic beam path, in particular for fast changeover between these beam paths, reference may be made to the statements above. The same applies respectively to the use according to the present invention of the microscope according to the present invention and of the method according to the present invention. The features of the invention which are discussed here have the same significance for the aforesaid aspects of the invention.

Further advantages and embodiments of the invention are evident from the description and the appended drawings.

It is understood that the features recited above and those yet to be explained below are usable not only in the respective combination indicated, but also in other combinations or in isolation, without departing from the scope of the present invention.

The invention is schematically depicted in the drawings on the basis of an exemplifying embodiment, and will be described in detail below with reference to the drawings.

DETAILED DESCRIPTION OF THE PREFERRED EMBODIMENTS

Figure 1:
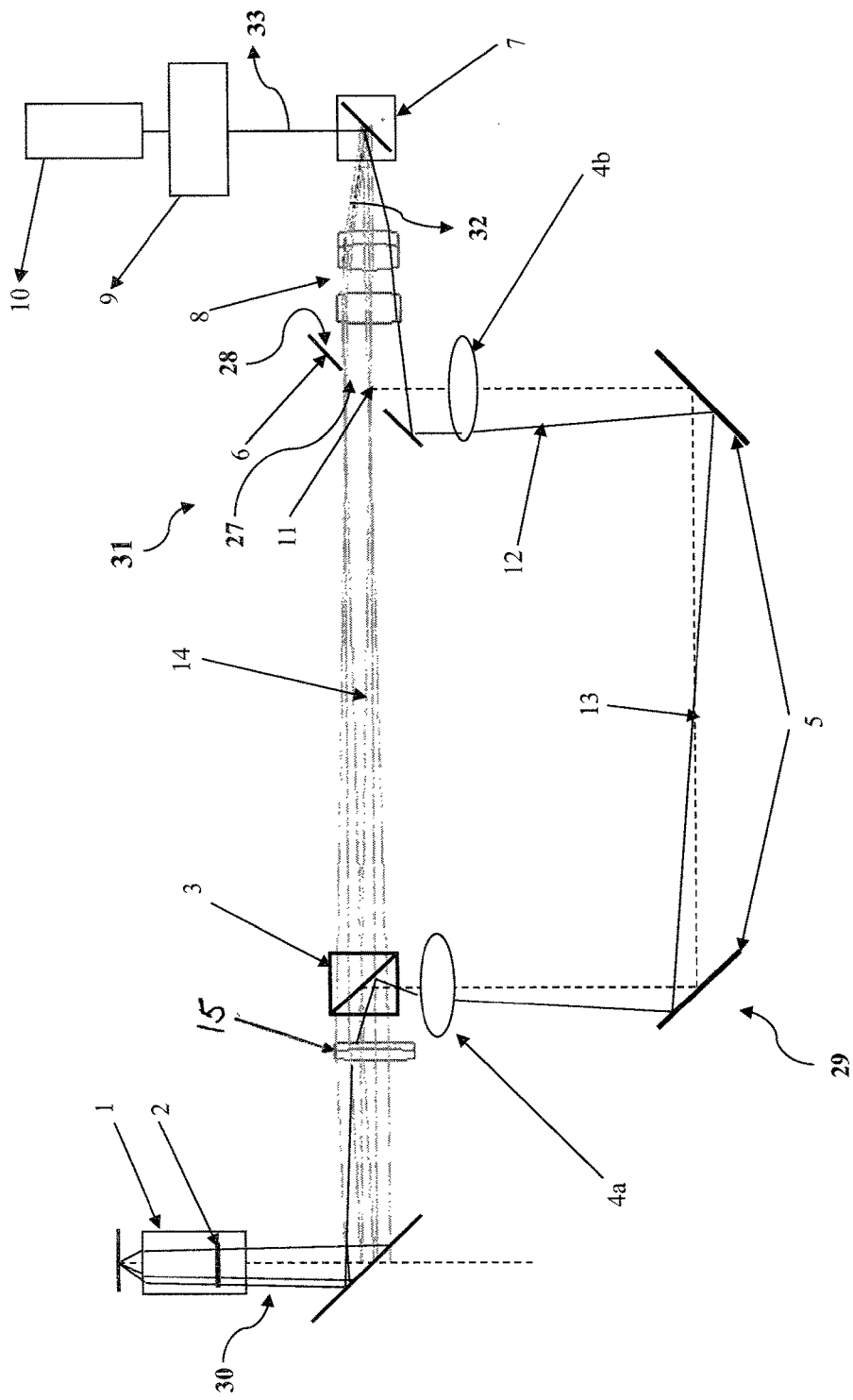
FIG. 1 shows the schematic configuration of an illumination unit of a microscope according to the present invention.

FIG. 1 shows a particularly preferred embodiment of an illumination unit for selectable generation of an orthoscopic beam path 14 and of a conoscopic beam path 13, with the possibility of a fast changeover between the corresponding illumination modes. Illumination unit 31 encompasses for this purpose a laser 10 as a light source, followed by an acousto-optical tunable filter (AOTF) as wavelength selector 9. Depending on the specific application, the desired wavelength can be selected from the wavelength spectrum of laser 10 by means of AOTF 9. The illuminating rays (laser light) propagate along illuminating beam path 32 and strike a displacement unit 7 that is also referred to as a "scanner." X-Y scanners for highly accurate displacement of illuminating beam path 32 are known from the existing art. FIG. 1 schematically depicts two possible illuminating beam paths 32, one of the two illuminating beam paths 32 propagating along main axis 33 (optical axis), while the other proceeds instead at the edge of the maximum possible image scan field. The illuminating rays are focused by a scanning eyepiece 8 into image plane 11 of scanning eyepiece 8, where a mirror surface 6, also referred to as a scanning mirror or annular mirror, is arranged.

In this exemplifying embodiment mirror surface 6 is made up of an annular mirror, i.e. a reflective annular surface 28, that surrounds a transparent opening 27. Illuminating rays passing through this opening 27 consequently propagate along an orthoscopic beam path 14. They pass, (substantially) without impediment, through beam splitter 3 and are focused by scanning lens 15 and objective 1 of a microscope 30 (depicted here only rudimentarily) onto an object in the object plane. A maximum image scan field, and thus a corresponding field on the object, can be scanned by X-Y displacement of illuminating beam path 32. The orthoscopic beam path thus enables pointlike scanning illumination of the object. The maximum image scan field is defined by opening 27 in mirror 6.

If the scanning angle exceeds a specific value, the illuminating beam path then strikes reflective region 28 of annular mirror 6 outside opening 27. After reflection at the reflective surface, laser beam 12 propagates via additional optic 29 along main axis 13 of the conoscopic beam path. Additional optic 29 contains a mirror system 5 and an optical system 4a, 4b by which the conoscopic beam path is combined again with the orthoscopic beam path upstream from scanning lens 15. Optical system 4a, 4b is designed in such a way that exit pupil 2 of microscope objective 1, in this case a TIRF objective, is imaged by magnification out to the limit aperture of total reflection (here at approx. 1.37) into image plane 11 of scanning eyepiece 8, in such a way that it is congruent with the maximum image scan field. This ensures that evanescent illumination occurs as soon as the scanning angle of displacement unit 7 reaches a value at which illumination beam path 32 strikes reflective region 28 of mirror surface 6. Within the maximum image scan field, normal image scanning can be performed without restriction, even using different objectives 1.

Additional optic 29 advantageously contains a mirror system 5, here made up of two deflection mirrors, and an optical system 4a and 4b having the function of a Bertrand lens unit.

Opening 27 in mirror surface 6 is advantageously elliptical, so that a projection of opening 27 onto a plane that is perpendicular to main axis 33 yields a circular image scan field. In this exemplifying embodiment all reflective surfaces are tilted 45° with reference to the respective main axes, so that substantially 90° reflections of the beam paths take place at the mirror surfaces.

In many application instances, pointlike scanning illumination will be accomplished with a different wavelength from evanescent illumination. In this case the changeover between the necessary wavelengths can be performed by AOTF 9 in very short switchover times. Applications in which both illumination modes are implemented with the same wavelength are also conceivable. Also conceivable are embodiments in which only pointlike scanning illumination or only evanescent illumination (possibly in addition to other illumination modes) are intermittently required. For this instance, AOTF 9 can be operated as a shutter that selects or blocks out the suitable wavelength as required.

Beam splitter 3 can be a wavelength-specific beam splitter or a polarizing beam splitter. If different wavelengths are required for beam paths 13 and 14, a wavelength-specific beam splitter 3 is appropriate. Conversely, if the possible instance of identical wavelengths also needs to be provided for, a polarizing beam splitter can be used as beam splitter 3. Polarized laser light whose polarization direction, for example in the context of propagation along orthoscopic beam path 14, passes unimpededly through beam splitter 3 is then used for this. On the other hand, a $\lambda/2$ plate is introduced into conoscopic beam path 13, preferably between the two deflection mirrors of mirror system 5. This causes a 90° rotation of the polarization direction. Beam splitter 3 constituting a polarizing splitter is reflective for this polarization direction. The two beam paths are thereby combined again, as depicted in FIG. 1.

Figure 2:
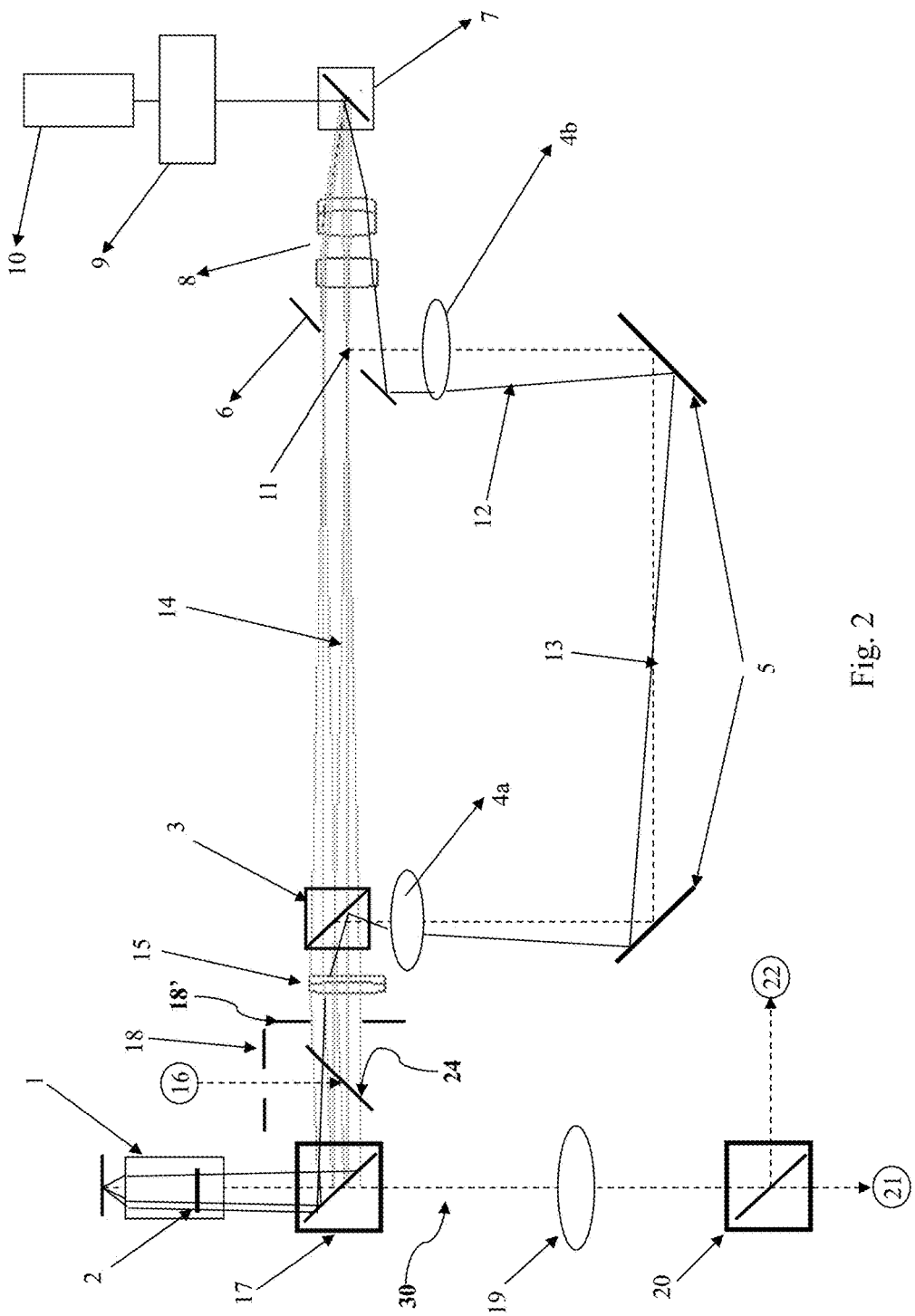
FIG. 2 shows a microscope according to the present invention having an illumination unit for widefield microscopy.

FIG. 2 shows the embodiment of a widefield microscope with an illumination unit 31 adapted thereto, the general configuration of illumination unit 31 conforming to that of FIG. 1. Constituents that correspond to one another will thus not be explained again.

Essential constituents of microscope 30 (in addition to illumination unit 31) that are depicted in FIG. 2 are microscope objective 1, a tube lens 19, and a splitter 20 that performs a division of the observation beam path into a visual beam path 21 and a documentation beam path 22. While visual beam path 21 leads to an eyepiece (not depicted) of microscope 30, documentation beam path 22 as a rule leads to a camera. In the application instance considered here, a specific fluorescence filter block 17 is provided in order to separate the illuminating beam path or paths from the observation beam path. The number 16 designates the standard fluorescent incident light axis of the microscope, which is coupled via interface 18 into the microscope. A further interface that can be used to couple in additional illumination units is available at 18'.

Excitation light is directed in ordinary fashion via the fluorescence filter block to microscope objective 1 via fluorescent incident light axis 16 and a mirror 24. Fluorescent light emitted from the object passes again through microscope objective 1 and fluorescence filter block 17 to tube lens 19 and from there into the visual beam path or documentation beam path.

The conoscopic and orthoscopic beam paths are guided to objective 1 by switching over mirror 24. Mirror 24 can also be embodied fixedly as a dichroic or polarizing beam splitter, omitting any switchover. The manner of operation of the two beam paths has already been described and will not be explained again. A fluorescence microscope can in this fashion can be combined with or expanded to include a TIRF, manipulation, and multiphoton microscope.

Figure 3:
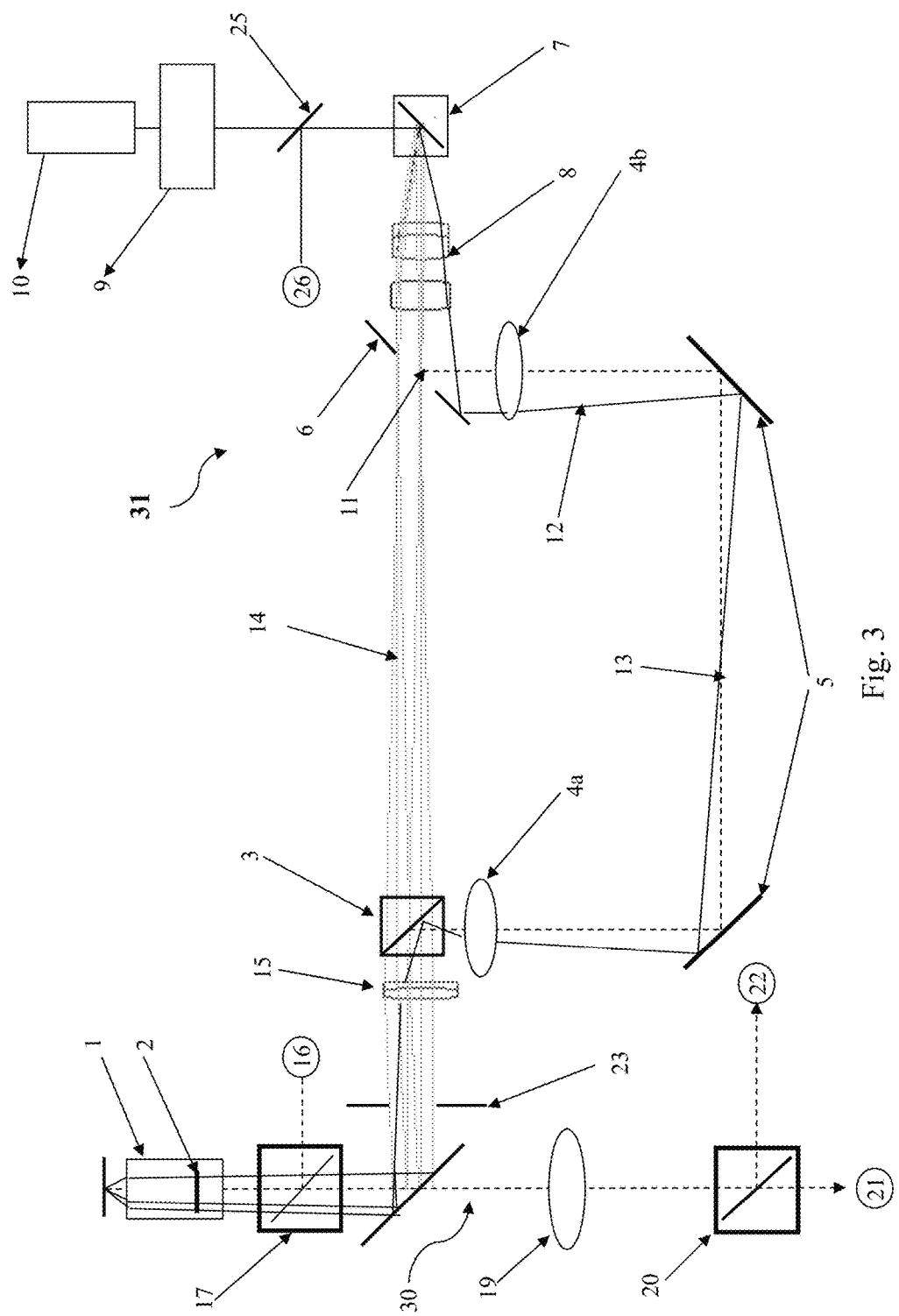
FIG. 3 shows a microscope according to the present invention having an illumination unit for confocal microscopy.

FIG. 3 shows another possible arrangement proceeding from the schematic configuration for confocal microscope depicted in FIG. 1.

The fluorescent light axis is again labeled 16 and the fluorescence filter block 17. Fluorescent light emitted from the object once again travels via microscope objective 1 and fluorescence filter block 17 to tube lens 19 and from there into the visual beam path or documentation beam path (see explanations of FIG. 2). The addition of spectral beam splitter 25 and confocal detection beam path 26 to illumination unit 31 yields a confocal scanning microscope. Image generation with confocal imaging is accomplished according to the known principle of confocal microscopy. In the present embodiment, displacement unit 7 has the function of the confocal scan and descan mirror, which guides the excitation light in positionally accurate fashion to the sample and guides the detected light via a spectral beam splitter 25 back to the statically positioned confocal detector 26.

In the context of guidance of the excitation light through conoscopic beam path 13, detection of the scattered or reflected light emitted from the sample is guided by conventional imaging into a documentation beam path 22.

In this form a fluorescence microscope can be combined with or expanded to include a TIRF, manipulation, multiphoton, and confocal scanning microscope.

PARTS LIST

1 Objective
2 Exit pupil
3 Beam splitter
4a, 4b Optical system (Bertrand lens unit)
5 Mirror system
6 Mirror surface
7 Displacement unit, scanner
8 Scanning eyepiece
9 Wavelength selector, AOTF
10 Light source, laser
11 Image plane of scanning eyepiece
12 Laser beam
13 Conoscopic beam path
14 Orthoscopic beam path
15 Scanning lens
16 Fluorescent incident light axis
17 Fluorescence filter block
18, 18' Interfaces for further illumination units
19 Tube lens
20 Splitter
21 Visual observation beam path
22 Documentation beam path
23 Confocal interface
24 Mirror
25 Spectral beam splitter
26 Confocal detection beam path
27 Transparent region, opening
28 Reflective region
29 Additional optic
30 Microscope
31 Illumination unit
32 Illuminating beam path
33 Main axis of illuminating beam path

What is claimed is:

1. A microscope comprising an objective and an illumination unit for selectable generation of an orthoscopic beam path proceeding through the objective for point-like scanning illumination, and of a conoscopic beam path proceeding through the objective for evanescent illumination of an object, the illumination unit comprising:
    a light source for generating illuminating rays along an illuminating beam path;
    a displacement unit for deflecting the illuminating beam path;
    a scanning eyepiece, placed after the displacement unit, for focusing the illuminating rays into an image plane of the scanning eyepiece; and
    a mirror surface arranged in the image plane of the scanning eyepiece, having a transparent region for generating the orthoscopic beam path and having an at least partly reflective region facing toward the scanning eyepiece for generating the conoscopic beam path from the illuminating beam path,
    the image plane of the scanning eyepiece being located, with reference to the conoscopic beam path, in a plane conjugated with the exit pupil of the objective.

2. The microscope according to claim 1, wherein the transparent region of the mirror surface represents an opening in a mirror, the opening being arranged centeredly with respect to a main axis of the illuminating beam path.

3. The microscope according to claim 1, wherein the mirror surface is arranged at a tilt with respect to a main axis of the illuminating beam path.

4. The microscope according to claim 3, wherein the mirror surface is arranged at a 45° tilt with respect to the main axis of the illuminating beam path.

5. The microscope according to claim 1, wherein the transparent region of the mirror surface has a geometric shape whose projection onto a plane perpendicular to a main axis of the illuminating beam path yields a circular shape.

6. The microscope according to claim 5, wherein the transparent region of the mirror surface has the geometrical shape of an ellipse.

7. The microscope according to claim 5, wherein the projection of the transparent region onto the plane is congruent with an image of the exit pupil of the objective at a limit aperture of total reflection in the conoscopic beam path.

8. The microscope according to claim 1, wherein an additional optic is provided for coupling the conoscopic beam path into the microscope objective.

9. The microscope according to claim 8, wherein the additional optic comprises a mirror system and a coordinated optical system that is designed in such a way that focus of the illuminating rays of the conoscopic beam path is located in the exit pupil of the objective.

10. The microscope according to claim 9, wherein the coordinated optical system comprises two Bertrand lenses.

11. The microscope according to claim 8, wherein the additional optic comprises a beam splitter that is arranged in the orthoscopic beam path and combines the conoscopic beam path with the orthoscopic beam path.

12. The microscope according to claim 11, wherein the beam splitter is a polarizing beam splitter, a $\lambda/2$ plate being arranged in the orthoscopic or conoscopic beam path.

13. The microscope according to claim 1, wherein one or more lasers for generating illuminating rays of a specific wavelength spectrum are present as a light source, a wavelength selector being arranged in the illuminating beam path.

14. The microscope according to claim 13, wherein the wavelength selector is an acousto-optical tunable filter (AOTF).

15. The microscope of claim 1, wherein the microscope is used for fast changeover between pointlike scanning illumination and evanescent illumination of the object in the microscope.

16. The microscope of claim 15, being in a scanning imagine method.

17. The microscope of claim 16, wherein the scanning imaging method represents at least one of the following methods: total internal fluorescence microscopy (TIRFM), scanning microscopy, confocal scanning microscopy, fluorescence recovery after photobleaching (FRAP), Förster resonance energy transfer (FRET), and multiphoton microscopy.

18. A method for selectable generation of an orthoscopic beam path proceeding through an objective of a microscope for pointlike scanning illumination, and of a conoscopic beam path proceeding through the objective for evanescent illumination of an object, the method comprising:
- generating, by a light source, illuminating rays along an illuminating beam path;
- deflecting, by a displacement unit, the illuminating beam path;
- focusing, by a scanning eyepiece placed after the displacement unit, the illuminating rays into an image plane of the scanning eyepiece; and
- arranging a mirror surface, in the image plane of the scanning eyepiece having a transparent region and having an at least partly reflective region facing toward the scanning eyepiece,
- wherein the image plane of the scanning eyepiece is located, with reference to the conoscopic beam path, in a plane conjugated with an exit pupil of the objective, and
- wherein the orthoscopic beam path is generated by the illuminating beam path being deflected by the displacement unit in such a way that the illuminating beam path passes through the transparent region of the mirror surface, and the conoscopic beam path is generated in such a way that the illuminating beam path is deflected by the displacement unit in such a way that the illuminating beam path strikes the reflective region of the mirror surface.

19. The method of claim 18, wherein the microscope is used for fast changeover between pointlike scanning illumination and evanescent illumination of the object in the microscope.

20. The method of claim 19, being a scanning imaging method.

21. The method of claim 20, wherein the scanning imaging method represents at least one of the following methods: total internal fluorescence microscopy (TIRFM), scanning microscopy, confocal scanning microscopy, fluorescence recovery after photobleaching (FRAP), Förster resonance energy transfer (FRET), and multiphoton microscopy.

* * * * *